(12) United States Patent
Bianchi et al.

(10) Patent No.: US 9,506,580 B2
(45) Date of Patent: Nov. 29, 2016

(54) ELECTRONIC SYSTEM, METHOD, AND PROGRAM FOR CONTROLLING A VARIABLE-CONFIGURATION LAY RAMP OF A PIPELINE LAYING VESSEL, TO LAY A PIPELINE ON THE BED OF A BODY OF WATER

(71) Applicant: SAIPEM S.p.A., San Donato Milanese (IT)

(72) Inventors: Stefano Bianchi, Cernusco sul Naviglio (IT); Federico Gaggiotti, Ancona (IT); Federico Formentini, Falconara Marittima (IT); Stefano Sovilla, Mogliano Veneto (IT); Roberto Bruschi, Falconara Marittima (IT); Diego Lazzarin, Treviso (IT)

(73) Assignee: SAIPEM S.P.A., San Donato Milanese (IT)

( * ) Notice: Subject to any disclaimer, the term of this patent is extended or adjusted under 35 U.S.C. 154(b) by 23 days.

(21) Appl. No.: 14/374,182

(22) PCT Filed: Jan. 28, 2013

(86) PCT No.: PCT/IB2013/050727
§ 371 (c)(1),
(2) Date: Jul. 23, 2014

(87) PCT Pub. No.: WO2013/111122
PCT Pub. Date: Aug. 1, 2013

(65) Prior Publication Data
US 2015/0037101 A1   Feb. 5, 2015

(30) Foreign Application Priority Data
Jan. 27, 2012  (IT) .............................. MI2012A0101

(51) Int. Cl.
*B63B 35/03* (2006.01)
*F16L 1/20* (2006.01)
(Continued)

(52) U.S. Cl.
CPC ................ *F16L 1/225* (2013.01); *B63B 35/03* (2013.01); *F16L 1/205* (2013.01); *F16L 1/207* (2013.01); *F16L 1/235* (2013.01); *G05B 15/02* (2013.01)

(58) Field of Classification Search
CPC .......... B63B 35/03; F16L 1/18; F16L 1/225; F16L 1/235
See application file for complete search history.

(56) References Cited

U.S. PATENT DOCUMENTS

| 3,487,648 A | 1/1970 | Lawrence |
| 3,668,878 A * | 6/1972 | Jones ........................ F16L 1/18 114/144 A |

(Continued)

FOREIGN PATENT DOCUMENTS

| WO | WO 2009/098586 A2 | 8/2009 |
| WO | WO 2011/077238 A1 | 6/2011 |
| WO | WO 2011/086100 A2 | 7/2011 |

OTHER PUBLICATIONS

Notification Concerning Submission, Obtention or Transmittal of Priority Document (Form PCT/IB/304) for International Application No. PCT/IB2013/050727 dated May 2, 2013.

(Continued)

*Primary Examiner* — Benjamin Fiorello
(74) *Attorney, Agent, or Firm* — Neal, Gerber & Eisenberg LLP (57) ABSTRACT

An electronic control system configured to control a variable-configuration lay ramp of a pipeline laying vessel, to lay a pipeline on the bed of a body of water, is configured to: acquire data including data related to the configuration of the lay ramp, data related to the laying vessel, and data related to the forces transmitted by the lay ramp and the laying vessel to the pipeline; generate a plurality of step sequences to change the configuration of the lay ramp from a first to a second work configuration; and select a best step sequence as a function of the plurality of step sequences and the acquired data, so as to minimize the stress induced in the pipeline at each intermediate configuration between the first and second work configuration.

28 Claims, 4 Drawing Sheets

(51) Int. Cl.
*F16L 1/225* (2006.01)
*F16L 1/235* (2006.01)
*G05B 15/02* (2006.01)

(56) References Cited

U.S. PATENT DOCUMENTS

| | | | | | |
|---|---|---|---|---|---|
| 4,030,311 | A | * | 6/1977 | Rafferty | F16L 1/225 405/166 |
| 4,257,718 | A | * | 3/1981 | Rosa | B63B 35/03 114/265 |
| 4,755,947 | A | * | 7/1988 | Braschler | G05D 1/0208 405/158 |
| 5,527,134 | A | * | 6/1996 | Recalde | F16L 1/202 405/166 |
| 5,533,834 | A | * | 7/1996 | Recalde | F16L 1/202 405/166 |
| 6,328,502 | B1 | * | 12/2001 | Hickey | B63B 35/03 405/168.3 |
| 8,827,595 | B2 | * | 9/2014 | Brocklebank | F16L 1/19 405/166 |
| 2011/0052324 | A1 | * | 3/2011 | Bruschi | B63B 35/03 405/166 |
| 2012/0288334 | A1 | * | 11/2012 | Bellin | B63B 35/03 405/160 |

OTHER PUBLICATIONS

International Search Report and Written Opinion for International Application No. PCT/IB2013/050727 dated Apr. 22, 2013.
PCT Demand (Form PCT/IPEA/401) for International Application No. PCT/IB2013/050727 dated Nov. 27, 2013.
Response to the International Search Report and Written Opinion for International Application No. PCT/IB2013/050727 dated Nov. 27, 2013.
Notification of Receipt of Demand by Competent International Preliminary Examining Authority (Form PCT/IPEA/402) for International Application No. PCT/IB2013/050727 dated Dec. 2, 2013.
Notification of Transmittal of the International Preliminary Report on Patentability (Form PCT/IPEA/416) for International Application No. PCT/IB2013/050727 dated Apr. 8, 2014.
International Preliminary Report on Patentability (Form PCT/IPEA/409) for International Application No. PCT/IB2013/050727 dated Apr. 8, 2014.

* cited by examiner

ELECTRONIC SYSTEM, METHOD, AND PROGRAM FOR CONTROLLING A VARIABLE-CONFIGURATION LAY RAMP OF A PIPELINE LAYING VESSEL, TO LAY A PIPELINE ON THE BED OF A BODY OF WATER

PRIORITY CLAIM

This application is a national stage application of PCT/IB2013/050727, filed on Jan. 28, 2013, which claims the benefit of and priority to Italian Patent Application No. MI2012A 000101, filed on Jan. 27, 2012, the entire contents of which are each incorporated by reference herein.

BACKGROUND

Lay ramps of pipeline laying vessels are normally of variable-configuration design. That is, a lay ramp normally comprises a number of segments hinged to one another and to the laying vessel; and a number of pipeline supports. The position of each segment is adjustable with respect to the laying vessel and/or to the other segments, and each support is fitted adjustably to one of the segments to minimize the forces transmitted to the pipeline, and to define a pipeline configuration designed to minimize stress induced in the pipeline. A lay ramp of this type is described in Applicant's PCT Patent Application No. WO 2011/086100 A2. When laying the pipeline, the lay ramp configuration normally varies slightly to adapt to changing external conditions or to operating parameters of the laying vessel. When laying work is stopped by bad weather, the pipeline is abandoned on the bed of the body of water, and the lay ramp is set to a safety configuration above water.

When the topography of the bed along which the pipeline is to be laid varies considerably, the configuration of the lay ramp varies widely between a first and second work configuration. In this connection, it is important to remember that a path along which to lay the pipeline is determined beforehand, and extends inside a laying corridor (i.e., a theoretical strip along the bed of the body of water). To avoid overstressing the pipeline, this is normally abandoned before changing the configuration of the lay ramp.

SUMMARY

The present disclosure relates to an electronic control system configured to control a variable-configuration lay ramp of a pipeline laying vessel, to lay an underwater pipeline on the bed of a body of water.

It is an advantage of the present disclosure to provide an electronic control system configured to control a lay ramp of a laying vessel configured to lay an underwater pipeline on the bed of a body of water, wherein the electronic control system enables to change the configuration of the lay ramp between a first and second work configuration without abandoning the pipeline, and while at the same time maintaining acceptable induced stress in the pipeline.

According to the present disclosure, there is provided an electronic control system configured to control a variable-configuration lay ramp of a pipeline laying vessel, to lay a pipeline on the bed of a body of water; the electronic control system being configured to: process data related to the lay ramp, data related to the laying vessel, and data related to stress induced in the pipeline; generate a plurality of step sequences to change the configuration of the lay ramp from a first to a second work configuration; and select a best step sequence as a function of the plurality of step sequences and the acquired data, so as to minimize the stress induced in the pipeline at each intermediate configuration between the first and second work configuration.

The system according to the present disclosure provides for selecting the step sequence best configured to maintain acceptable induced stress in the pipeline. Proceeding in steps also makes it easier to monitor changes induced by the altered configuration of the lay ramp.

Accordingly, the electronic control system of certain embodiments is configured to transmit commands to the lay ramp to implement at least one step in the best step sequence. Operating this way, checks as described below can be made after the step in the best step sequence is performed.

In one embodiment of the present disclosure, the electronic control system is configured to assign to each step in the best step sequence estimated values related to the intermediate configuration of the lay ramp; acquire data related to the configuration of the lay ramp in the intermediate configuration, and consistent with the estimated values; and compare the estimated values with the acquired data.

The estimated values assigned to each step are values related to a lay ramp configuration and calculated before the lay ramp is set to that particular configuration, whereas the acquired data is data related to a lay ramp configuration and acquired when the lay ramp is actually in that particular configuration.

The estimated values and acquired data are homogeneous and therefore comparable. To compare them, the estimated values and acquired data are normally related to the geometric configuration of the lay ramp and/or to the forces exchanged between the lay ramp and the pipeline.

Depending on the outcome of the comparison, the electronic control system decides whether or not to continue implementing the best step sequence. More specifically, the electronic control system is configured to transmit commands to implement at least one further step in the best step sequence, when the difference between the estimated values and the acquired data related to the intermediate configuration of the lay ramp satisfies designated or given acceptance criteria.

The electronic control system is also configured to disable implementation of further steps in the best step sequence, when the difference between the estimated values and the acquired data related to the intermediate configuration of the lay ramp does not satisfy designated or given acceptance criteria.

In this case, a new strategy must be defined to change the configuration of the lay ramp from the intermediate configuration to the second work configuration. Accordingly, the electronic control system is configured to generate another plurality of step sequences to change the configuration of the lay ramp from an intermediate configuration to the second work configuration; and select a further best step sequence as a function of the plurality of step sequences and the acquired data, so as to minimize the stress induced in the pipeline at each intermediate configuration between the initial intermediate configuration and the second work configuration.

In other words, a further best step sequence, selected using the same criteria as for the previous best step sequence, is proposed.

The optimization method used to determine the best step sequence and any further best step sequences is, in certain embodiments, based on genetic algorithms.

That is, the plurality of step sequences corresponds to a population of individuals, and each step sequence corresponds to an individual. Selection is typically based on a so-called fitness function, which, in this case, is related to the stress induced in the pipeline. When applied to each individual/step sequence, the fitness function assigns a score to the population of individuals, and eliminates individuals with lower scores.

The remaining individuals/step sequences are combined using the crossover technique, which, in this case, generates a new-generation step sequence by combining two portions of formerly first-generation sequences. The substitution technique may also be used in this case to generate new individuals.

Generally speaking, the stress induced in the pipeline is real-time monitored. The pipeline is substantially subjected to external forces transmitted by the laying vessel and lay ramp, and to predominantly flexural stress produced by the configuration of the pipeline between the laying vessel and the bed of the body of water.

In certain embodiments of the present disclosure, the electronic control system is configured to acquire the forces transmitted by the laying vessel and lay ramp to the pipeline.

These forces are easily detectable using sensors located on supports along the lay ramp, and on tensioning devices configured to release the pipeline in controlled manner from the laying vessel.

In certain embodiments of the present disclosure, the electronic control system is configured to calculate the stress induced in the pipeline by the pipeline's configuration between the laying vessel and the bed of the body of water.

More specifically, the electronic control system is configured to calculate a configuration of the pipeline between the laying vessel and the bed of the body of water; to define a finite-element model of the pipeline; and to calculate the stress induced in the pipeline.

Real-time control of the pipeline is configured to indicate stress approaching critical levels, and to inform personnel so that appropriate steps may be taken to prevent stress from exceeding critical levels. Monitoring stress induced in the pipeline also provides reference parameters by which to define the fitness function.

In one embodiment of the present disclosure, the electronic control system comprises a centralized monitoring system configured to acquire, monitor, and memorize detectable data related to the lay ramp and the laying vessel; and a laying guidance system connected to the centralized monitoring system and configured to real-time monitor the stress induced in the pipeline.

In other words, the electronic control system architecture of this embodiment comprises two systems with different functions and interfaced to exchange information.

In certain embodiments of the present disclosure, the electronic control system comprises a lay ramp management system comprising a computer planner configured to implement an optimization program to determine the best step sequence, and a computer scheduler configured to implement and check the steps.

The computer planner is connected to the laying guidance system to acquire stress data, which is used to define the fitness function.

The computer scheduler is connected to the centralized monitoring system to acquire data related to the homogeneous characteristics of the estimated values.

In certain embodiments, the estimated values include estimated values related to the lay ramp configuration and/or to the forces exchanged between the lay ramp and the pipeline.

They may also include stress induced in the pipeline.

In certain embodiments of the present disclosure, the electronic control system is configured to generate a first quantity or number of step sequences with a first designated or given step, and a second plurality of step sequences with a second designated or given step, to change the configuration of the lay ramp from a first to a second work configuration; and select at least a first and a second best step sequence as a function of the acquired data and, respectively, of the first and the second plurality of step sequences, so as to minimize stress induced in the pipeline at each intermediate configuration between the first and second work configuration; the first designated or given step being greater than the second designated or given step.

Being greater than the second designated or given steps, the first designated or given steps change the lay ramp configuration faster, but the first best step sequence presumably produces greater stress in the pipeline—or, at any rate, is riskier—than the second best step sequence. In which case, the operator decides which best step sequence to implement under the circumstances.

In certain embodiments of the present disclosure, the electronic control system is associated with a lay ramp, which comprises a plurality of interconnected, adjustable-tilt segments, and a plurality of adjustable supports fitted to the segments. Each step in a step sequence corresponds to movement of a segment of a support.

The step sequence is therefore a sequence of movements of the segments and supports.

Another advantage of the present disclosure is to provide a method of controlling a variable-configuration lay ramp of a laying vessel, to lay a pipeline on the bed of a body of water, and which enables substantial changes in the configuration of the lay ramp without abandoning the pipeline, and without inducing excessive stress in the pipeline.

According to the present disclosure, there is provided a control method configured to control a variable-configuration lay ramp of a pipeline laying vessel, to lay a pipeline on the bed of a body of water; the control method comprising the stages of acquiring data related to the configuration of the lay ramp, data related to the laying vessel, and data related to stress induced in the pipeline; generating a plurality of step sequences to change the configuration of the lay ramp from a first to a second work configuration; and selecting at least one best step sequence as a function of the plurality of step sequences and the acquired data, so as to minimize the stress induced in the pipeline at each intermediate configuration between the first and second work configuration.

The present disclosure also includes a computer program loadable directly into a computer memory to perform the stages in the method; and a program product comprising a readable medium on which the program is memorized.

Additional features and advantages are described in, and will be apparent from the following Detailed Description and the figures.

BRIEF DESCRIPTION OF THE DRAWINGS

A non-limiting embodiment of the present disclosure will be described by way of example with reference to the attached drawings, in which.

DETAILED DESCRIPTION

Figure 1:
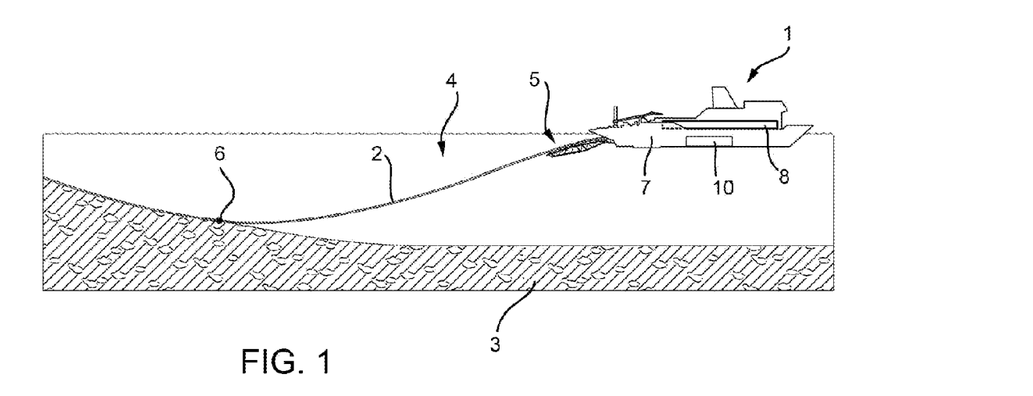
FIG. 1 shows a side view, with parts removed for clarity, of a laying vessel with a lay ramp in a first work configuration to lay a pipeline on the bed of a body of water.
Figure 2:
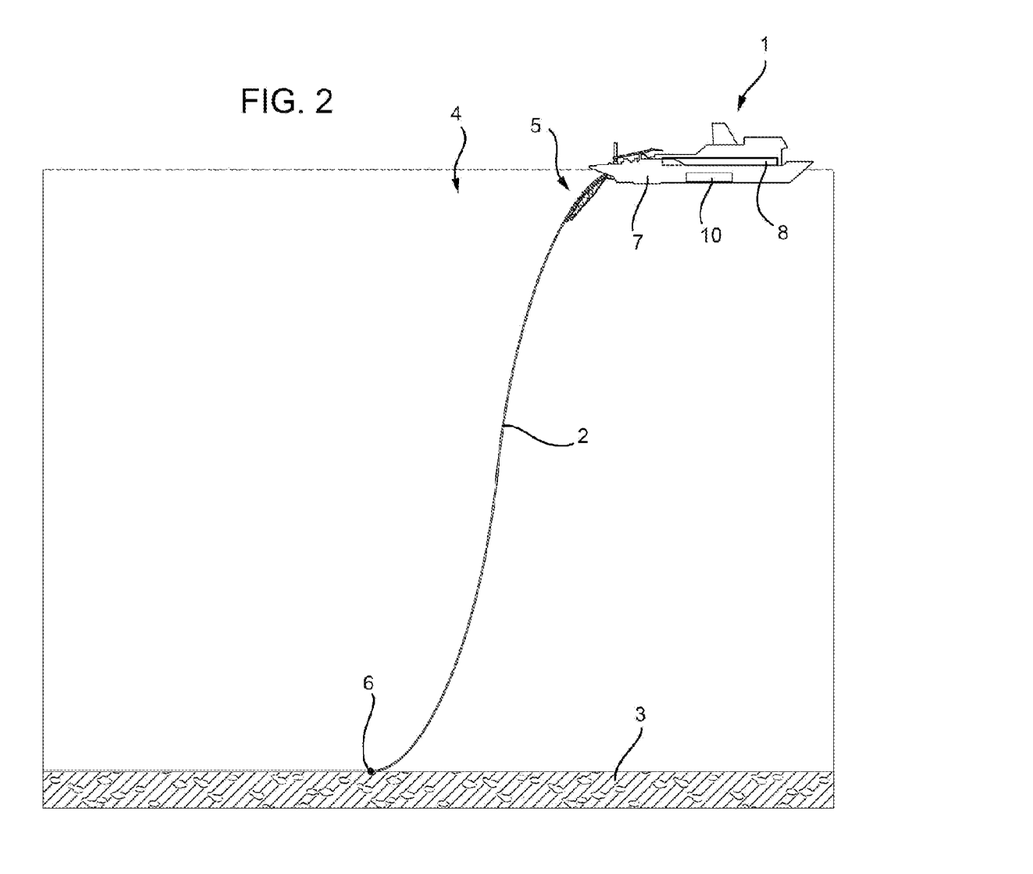
FIG. 2 shows a side view, with parts removed for clarity, of the FIG. 1 laying vessel with the lay ramp in a second work configuration to lay the underwater pipeline.

Referring now to the example embodiments of the present disclosure illustrated in FIGS. 1 to 5, number 1 in FIGS. 1 and 2 indicates as a whole a laying vessel configured to lay a pipeline 2 on the bed 3 of a body of water 4. The bathymetry of bed 3 of body of water 4 varies from a minimum along the shoreline, to a maximum, normally far offshore. Planning the laying of pipeline 2 on bed 3 comprises selecting the best path on the basis of project parameters, to define the best course for laying vessel 1 to follow when laying pipeline 2. Laying vessel 1 is equipped with a lay ramp 5 configured to guide pipeline 2 as pipeline is being laid. FIGS. 1 and 2 show laying vessel 1 in relatively shallow and relatively deep water respectively. In FIG. 1, lay ramp 5 is set to a first work configuration characterized by a gradual curve; in FIG. 2, lay ramp 5 is set to a second work configuration characterized by a sharp curve.

In FIG. 1, the pipeline 2 configuration is substantially S-shaped, sloping gradually between laying vessel 1 and bed 3, and characterized by a relatively small exit angle (with respect to the horizontal) of pipeline 2 from lay ramp 5. In FIG. 2, the pipeline 2 configuration is substantially in the form of a steeply sloping 'S', characterized by a relatively wide exit angle of pipeline 2 from lay ramp 5. Pipeline 2 contacts bed 3 at a so-called touch-down point (TDP) 6, which is an important parameter to ensure pipeline 2 is actually being laid along the set best path, and to determine the configuration of pipeline 2 between bed 3 and laying vessel 1.

The Laying Vessel

Figure 3:
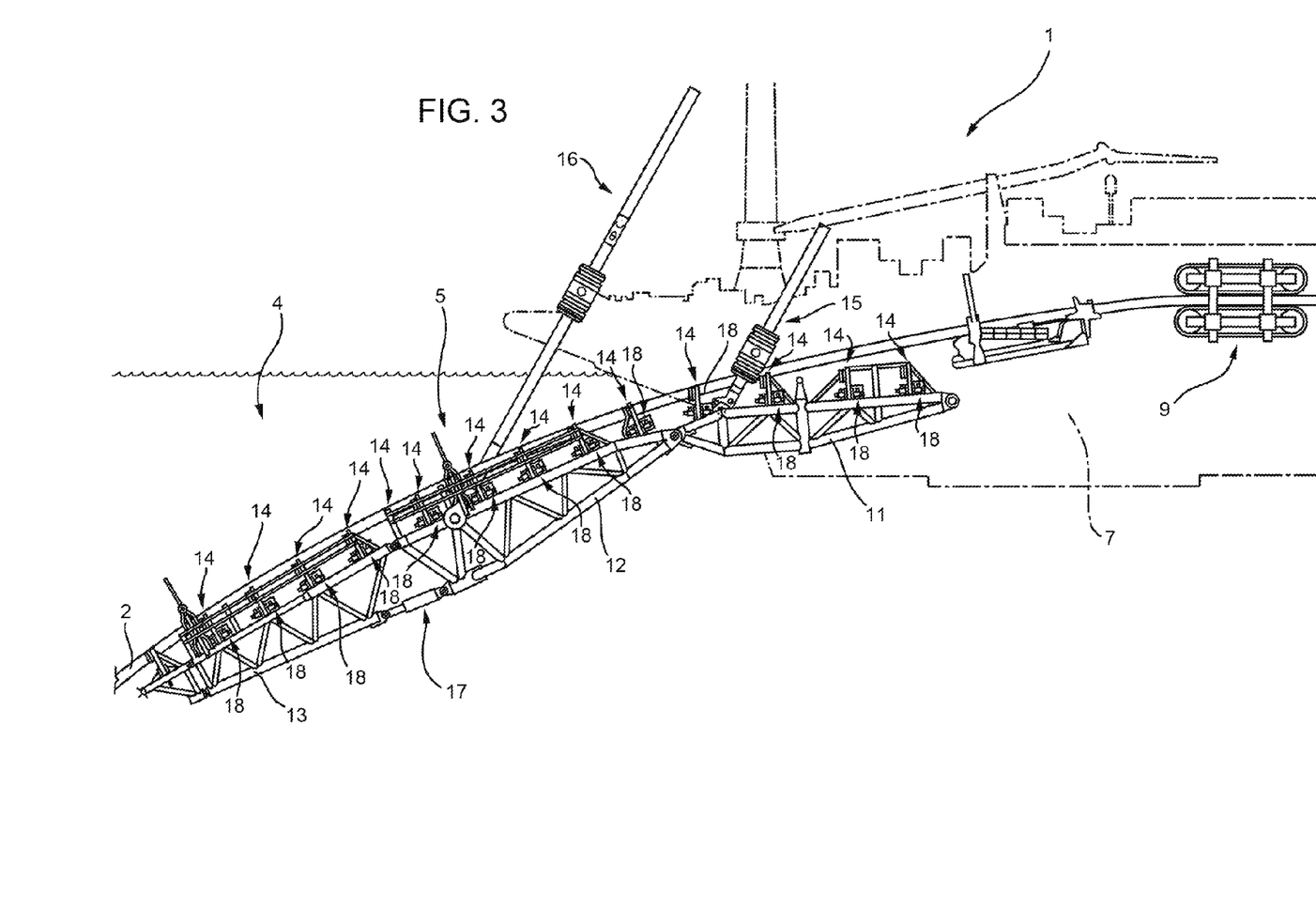
FIG. 3 shows a larger-scale side view, with parts removed for clarity, of the lay ramp in the first work configuration.

With reference to FIG. 1, laying vessel 1 comprises a floating structure 7, and an assembly line 8 configured to assemble unit-length pipe sections (not shown) into pipeline 2. Assembly line 8 comprises tooling (not shown) configured to prepare and weld the ends, and configured to coat the welded ends, of the pipe sections. With reference to FIG. 3, laying vessel 1 comprises tensioning devices 9 (only one shown in FIG. 3) configured to grip and release pipeline 2 in controlled manner from laying vessel 1. Tensioning device 9 subjects pipeline 2 to mainly tensile stress produced by the normally opposing forces exerted on pipeline 2 by laying vessel 1 and by the part of pipeline 2 downstream from tensioning device 9. Though FIG. 3 shows only one tensioning device 9, laying vessel 1 normally comprises a plurality of tensioning devices 9 arranged in series along pipeline 2.

Laying vessel 1 is moved, normally in steps, along the set course by a drive module 10 (FIGS. 1 and 2), which controls its travelling speed and course.

The Lay Ramp

Figure 4:
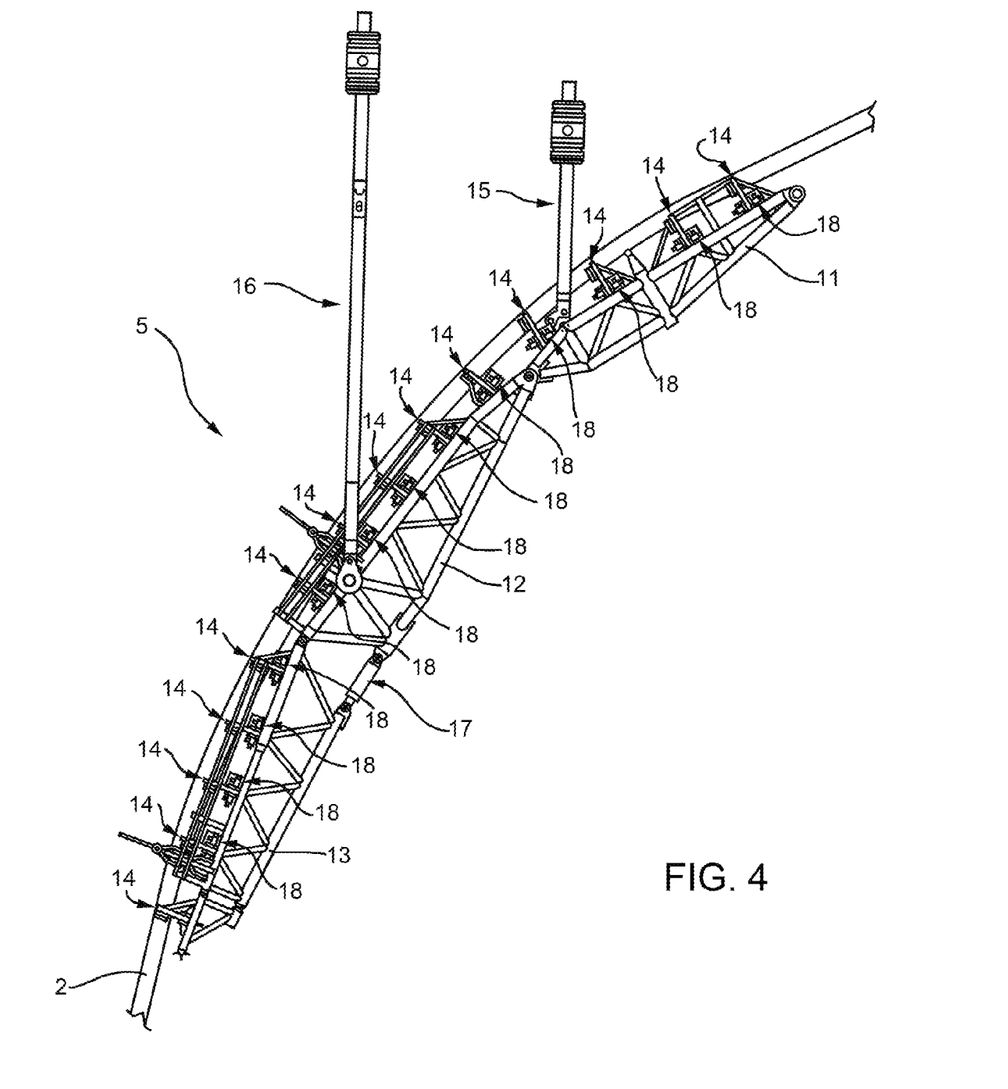
FIG. 4 shows a side view, with parts removed for clarity, of the FIG. 1 lay ramp in the second work configuration.

With reference to FIGS. 3 and 4, lay ramp 5 is hinged to laying vessel 1, and comprises a plurality of articulated segments 11, 12, 13; and a plurality of pipeline supports 14 fitted to segments 11, 12, 13. More specifically, each segment 11, 12, 13 is fitted with at least one support 14.

Lay ramp 5 comprises actuating assemblies 15, 16, 17 configured to move segments 11, 12, 13; and actuating assemblies 18 configured to move respective supports 14. More specifically, actuating assemblies 15, 16, 17 are connected to, and configured to adjust the position of, respective segments 11, 12, 13. More specifically, actuating assembly 15 connects segment 11 to laying vessel 1. Segment 11 being hinged directly to laying vessel 1, actuating assembly 15 provides for adjusting the angular position of segment 11 with respect to laying vessel 1. Actuating assembly 16 connects segment 12 to laying vessel 1. Segment 12 being hinged to segment 11, actuating assembly 16 provides for adjusting the angle between segments 12 and 11.

Actuating assembly 17 is connected to segments 12 and 13. Segments 12 and 13 being hinged to each other, actuating assembly 17 provides for adjusting the angle between segments 12 and 13.

Each support 14 comprises an actuating assembly 18 configured to adjust the position of the support with respect to the segment 11, 12, 13 to which that support 14 is fitted.

The positions of segments 11, 12, 13 and supports 14 define the path of pipeline 2 along lay ramp 5, and the configuration of pipeline 2 between lay ramp 5 and bed 3. In one embodiment, supports 14 must all contact pipeline 2 simultaneously.

Lay Ramp Electronic Control System

Figure 5:
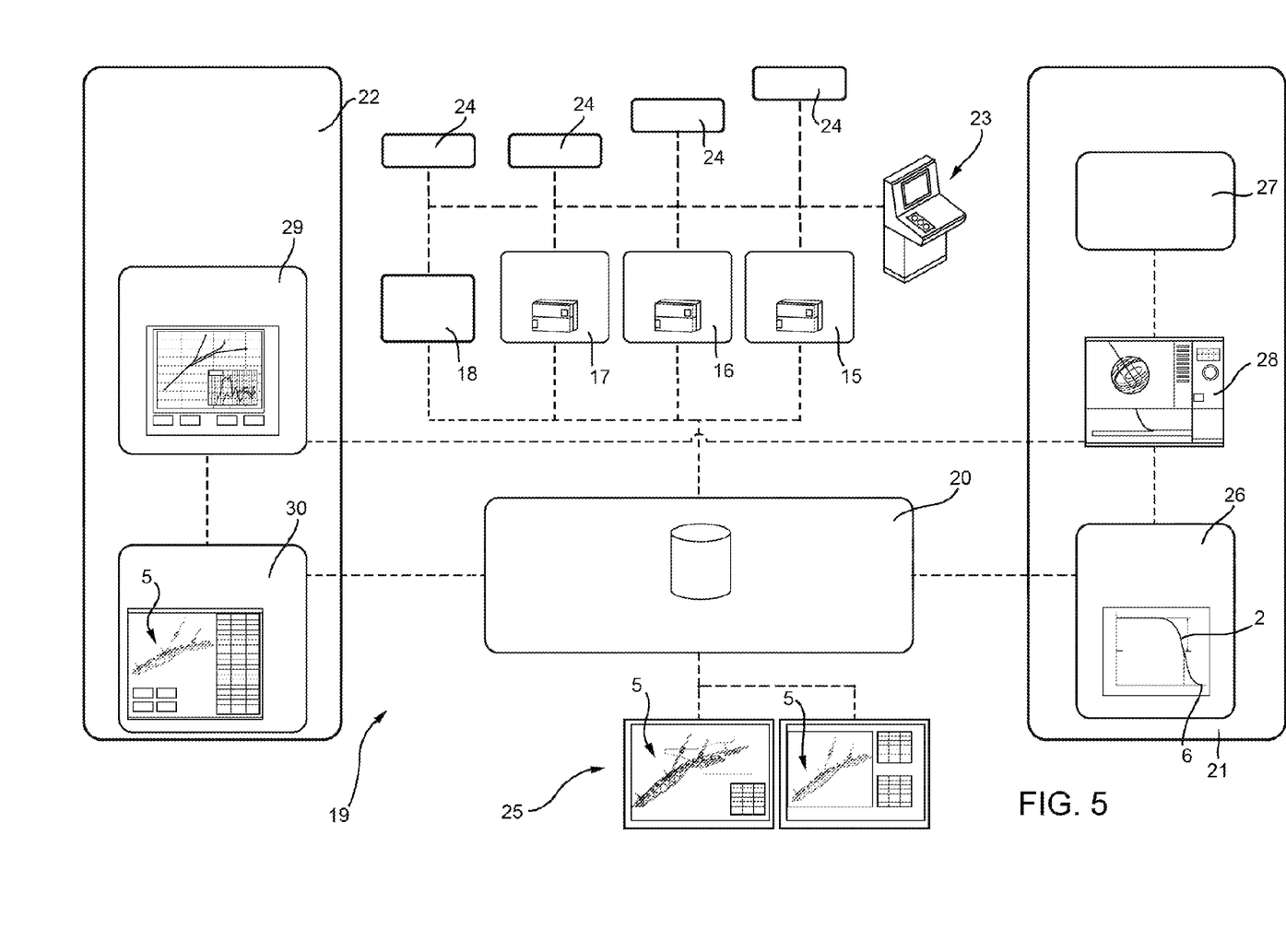
FIG. 5 shows a schematic block diagram, with parts removed for clarity, of an electronic control system configured to control the lay ramp.

Laying vessel 1 comprises an electronic control system 19 configured to control lay ramp 5. Though the following description refers specifically to the lay ramp 5 shown in the attached drawings, the general operating principles of the electronic control system also apply to lay ramps of other configurations. In various embodiments, electronic control system 19 comprises a centralized monitoring system (CMS) 20 configured to acquire, store, and display detectable data related to the equipment of laying vessel 1, to lay ramp 5, and to pipeline 2 (FIG. 1); a pipe-laying guidance system (PLG) 21 configured to real-time calculate the configuration of pipeline 2, and the stress induced in pipeline 2 as pipeline 2 is being laid, on the basis of the data acquired by centralized monitoring system 20; a ramp management system (RMS) 22 configured to calculate, program, and control a step sequence by which to change the configuration of lay ramp 5 from the first to the second work configuration, while minimizing induced stress in pipeline 2; and a control console 23 configured to control the laying procedure.

Centralized Monitoring System

Centralized monitoring system 20 is configured to acquire and store data comprising:
geometrical and mechanical pipeline 2 data;
laying vessel 1 position data;
the pipeline 2 laying corridor on bed 3 of body of water 4;
data related to the configuration of segments 11, 12, 13 of lay ramp 5 (FIG. 3);
data related to the position of each support 14 with respect to respective segment 11, 12, 13 (FIG. 3);
data related to the forces exchanged between pipeline 2 and laying vessel 1, and in particular between pipeline 2 and tensioning device 9 (FIG. 3);
data related to the forces exchanged between pipeline 2 and lay ramp 5 (FIG. 3), and in particular between pipeline 2 and supports 14;
data related to the topography of bed 3 (FIGS. 1 and 2).

In certain embodiments, centralized monitoring system 20 is also configured to acquire and store other data, comprising:

- weather and sea conditions, such as wind, current and wave motion;
- laying vessel 1 speed data;
- data related to touch-down point 6 of pipeline 2 (FIGS. 1 and 2), when this is detectable by sonar in relatively shallow water, or by underwater remote-operated vehicle (ROV—not shown in the drawings);
- pipeline 2 assembly data;
- data related to the exit angle of pipeline 2 from lay ramp 5 (FIGS. 3 and 4); and
- data related to the movements of laying vessel 1 in body of water 4, especially movements with six degrees of freedom.

Centralized monitoring system 20 is a supervising system configured to acquire the above data using appropriate sensors 24, and monitor and store the data. Centralized monitoring system 20 comprises a graphic interface 24 showing the whole assembly line 8 and lay ramp 5 (FIGS. 1 and 2). In the example shown, centralized monitoring system 20 interfaces with the tooling on assembly line 8 (FIG. 1), with laying guidance system 21, and with ramp management system 22, and is configurable architecturally to extend the above interfaces and to adapt to lay ramps of different configurations.

Laying Guidance System

The main purpose of laying guidance system 21 is to real-time monitor the stress induced in pipeline 2, to prevent overstressing pipeline 2.

Laying guidance system 21 is configured to calculate the stress induced in pipeline 2 as a function of the data stored in centralized monitoring system 20. Laying guidance system 21 comprises a data validating block 26; a computer 27 equipped with a memory and configured to calculate the configuration of pipeline 2 between lay ramp 5 and bed 3 of body of water 4 (FIGS. 1 and 2), and the stress induced in pipeline 2; and an operator interface block 28 configured to assist the operator in guiding laying vessel 1 (FIGS. 1 and 2). Computer 27 employs a program, based on the finite-element model theory, configured to calculate the configuration of, and the stress induced in, pipeline 2. In other words, laying guidance system 21 validates the data acquired by centralized monitoring system 20; determines the configuration of pipeline 2 between lay ramp 5 and touch-down point 6; constructs a finite-element model of pipeline 2; and calculates stress as a function of forces applied to the model of pipeline 2 and derived from the data stored in centralized monitoring system 20.

Ramp Management System

Ramp management system 22 comprises a computer planner 29 and a computer scheduler 30. Computer planner 29 receives information from laying guidance system 21, and is configured to process a program configured to generate a plurality of step sequences, and select a best step sequence as a function of the plurality of step sequences. Each step sequence is capable of changing the configuration of lay ramp 5 from the first to the second work configuration. Each step in a step sequence is associated with movement of one of segments 11, 12, 13 or a, support 14 (FIGS. 3 and 4). Optimization is based on minimizing the risk of overstressing pipeline 2.

In various embodiments, the best step sequence is selected using combinatorial optimization algorithms, in particular genetic algorithms. A few general principles and applications of genetic algorithms can be found in 'Introduction to Genetic Algorithms' by S. N. Sivanandam and S. N. Deepa; published by Springer; first edition (12 Dec., 2007).

Basically, each step sequence corresponds to an individual, and the plurality of step sequences corresponds to a population of individuals. The selection mechanism is determined by a fitness function, which, in the case in hand, is determined mainly on the basis of the stress values calculated by laying guidance system 21, and therefore takes into account the stress induced in pipeline 2 in the first work configuration. More specifically, the fitness function is defined to assign a better fitness value to an individual with better estimated stress values, than to an individual with worse estimated stress values. In certain embodiments, the fitness function also takes into account the total time taken to change from the first to the second work configuration.

Computer planner 29 generates a population of individuals using a generating method which may be random (i.e., the steps and relative step sequences are generated randomly) or semi-randomly (i.e., individuals are generated with a few predetermined parameters and a few random parameters), or are generated randomly within predetermined step value ranges. In other words, the steps in a sequence are generated randomly within predetermined step value ranges.

Computer planner 29 applies the fitness function to the population of individuals; assigns a fitness value to each individual in the population on the basis of the fitness function; and defines a rating, in which individuals are rated according to their respective fitness values, and in which the best fitness values are associated with individuals corresponding to the step sequences best suited to change the configuration of lay ramp 5.

Computer planner 29 selects the individuals assigned the best scores by the fitness function. Computer planner 29 generates a new population of individuals from the selected individuals using a generating technique. Generating techniques comprise, for example, a first so-called crossover technique, by which some parts of at least two selected individuals are combined to generate two new individuals; and a second so-called substitution or mutation technique, by which random changes are made to parts of a quantity or number of individuals.

Computer planner 29 defines a new rating of the new individuals by applying the fitness function to the new population of individuals; and re-selects the individuals with the best fitness values. Computer planner 29 keeps on generating new populations of individuals on the basis of the previously generated population, until one of a quantity or number of stop criteria is met. The stop criteria may, for example, comprise a limit to the quantity or number of new populations that can be generated, or the obtaining an individual with a fitness value within a designated or given range.

Whichever the case, computer planner 29 is able to select the individual with the best score, and obtain the best step sequence defined by the selected individual; and calculates the estimated values associated with each step in the best step sequence.

In certain embodiments, the estimated values include estimated values related to the configuration of lay ramp 5. In certain embodiments, the estimated values comprise geometric values defining the estimated positions of supports 14 and segments 11, 12, 13 (FIGS. 3 and 4) and/or values defining the estimated forces exchanged between lay ramp 5 and pipeline 2.

The estimated values may also include predicted values of stress induced in the pipeline.

Computer planner 29 transmits the best step sequence to computer scheduler 30, which communicates the individual steps in the best step sequence to centralized monitoring system 20 controlling actuating assemblies 15, 16, 17, 18 (FIGS. 3 and 4).

Computer scheduler 30 implements a program configured to execute each step in the best step sequence, and check that the intermediate configuration after each step is as expected. More specifically, checking consists in determining whether the data acquired by centralized monitoring system 20 after the step is executed, and homogeneous with the estimated values, corresponds with the estimated values, or rather, whether the difference between the estimated values and the acquired data meets predetermined acceptance criteria. If the difference between the acquired data and the estimated values does meet the acceptance criteria, computer scheduler 30 enables at least one further step in the best step sequence to be executed. Conversely, in the event of a significant difference between the acquired data and the estimated values (i.e., non-conformance with acceptance criteria), performance of the best step sequence previously selected by computer planner 29 is interrupted.

Laying guidance system 21, for real-time calculating the stress induced in pipeline 2, supplies updated stress data to computer planner 29, which accordingly defines a new fitness function.

On the basis of the data acquired by centralized monitoring system 20, computer planner 29 generates a new plurality of step sequences with a quantity or number of steps that takes into account the steps already performed, and selects a new best step sequence using the new fitness function. The new best step sequence is implemented by computer scheduler 30.

That is, using the genetic algorithm, computer planner 29 provides a new best step sequence, which is implemented by computer scheduler 30 as described above; and the above steps are performed until lay ramp 5 is set to the second work configuration.

The method described refers specifically to step sequences configured to move lay ramp 5, and in which the steps comprise angular movements of one of segments 11, 12, 13, and, in certain embodiments, linear movements of supports 14. The length of each step, be it angular or linear, is therefore a vital element in moving the lay ramp from a first to a second work configuration. The length of each step, in fact, affects the quantity or number of steps in the step sequence, the stress induced in pipeline 2, and the time taken to position lay ramp 5. Step length selection is based substantially on acceptable test-based values, but which vary within a wide range. A first step length selection technique consists in selecting an intermediate step length value in the designated or given range. A second technique consists in selecting multiple step length values, and concurrently performing multiple optimization procedures, to provide the operator with a plurality of best step sequences related to respective step lengths. For example, two step lengths may be selected—for the sake of simplicity, a 'long step' and a 'short step'. The best long-step' sequence will position lay ramp 5 faster and produce a designated or given stress in pipeline 2; whereas the best 'short-step' sequence will take longer to position lay ramp 5 and, presumably, will produce less stress than the best long-step' sequence.

The operator may thus select the best step sequence best suited to the circumstances at the time.

The advantages of the present disclosure lie in ensuring a high degree of safety, to reposition the lay ramp without abandoning the pipeline.

Clearly, changes may be made to the embodiment described of the present disclosure without, however, departing from the protective scope of the accompanying Claims. More specifically, though certain embodiments described of the present disclosure refers to a plurality of computers, each for implementing a specific computer program, the present disclosure also includes embodiments comprising different plurality of computers from those described, and even only one computer and one program. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electronic variable-configuration lay ramp control system comprising:
    a processor; and
    a memory device which stores a plurality of instructions, which when executed by the processor, cause the processor to:
        acquire data related to a positional configuration of a lay ramp of a pipeline laying vessel, the acquired data related to the pipeline laying vessel and the acquired data related to an amount of stress induced in a pipeline being laid on a bed of a body of water,
        generate a plurality of steps sequences to change the positional configuration of the lay ramp relative to the pipeline laying vessel from a first work configuration to a second, different work configuration,
        select a designated steps sequence from the generated plurality of steps sequences, said selection being based on the acquired data to minimize the amount of stress induced in the pipeline at each intermediate configuration between the first work configuration and the second, different work configuration, and
        transmit a plurality of commands to the lay ramp, the transmitted plurality of commands cause the lay ramp to implement at least one step in the designated steps sequence.

2. The electronic variable-configuration lay ramp control system of claim 1, wherein when executed by the processor, the plurality of instructions cause the processor to:
    assign estimated values to each step in the designated steps sequence, the estimated values related to the intermediate configuration of the lay ramp,
    acquire data related to the configuration of the lay ramp in the intermediate configuration, and
    compare the estimated values with the acquired data.

3. The electronic variable-configuration lay ramp control system of claim 2, wherein when executed by the processor when a difference between the estimated values and the acquired data related to the intermediate configuration of the lay ramp satisfies a designated acceptance criteria, the plurality of instructions cause the processor to transmit a plurality of commands to the lay ramp, said plurality of commands cause the lay ramp to implement at least another step in the designated steps sequence.

4. The electronic variable-configuration lay ramp control system of claim 2, wherein when executed by the processor when a difference between the estimated values and the acquired data related to the intermediate configuration of the lay ramp does not satisfy a designated acceptance criteria, the plurality of instructions cause the processor to disable implementation of any additional steps in the designated steps sequence.

5. The electronic variable-configuration lay ramp control system of claim 4, wherein when executed by the processor, the plurality of instructions cause the processor to:
generate another plurality of steps sequences to change the configuration of the lay ramp from an initial intermediate configuration to the second, different work configuration, and
select another designated steps sequence from the generated other plurality of steps sequences, said selection being based on the acquired data to minimize the amount of stress induced in the pipeline at each intermediate configuration between the initial intermediate configuration and the second, different work configuration.

6. The electronic variable-configuration lay ramp control system of claim 1, wherein when executed by the processor, the plurality of instructions cause the processor to:
select the designated steps sequence based on genetic algorithms, and
construct a fitness function related to the amount of stress induced in the pipeline.

7. The electronic variable-configuration lay ramp control system of claim 1, wherein when executed by the processor, the plurality of instructions cause the processor to acquire a plurality of forces transmitted by the pipeline laying vessel and the lay ramp to the pipeline.

8. The electronic variable-configuration lay ramp control system of claim 7, wherein when executed by the processor, the plurality of instructions cause the processor to calculate the amount of stress induced in the pipeline.

9. The electronic variable-configuration lay ramp control system of claim 1, wherein when executed by the processor, the plurality of instructions cause the processor to calculate the configuration of the pipeline between the pipeline laying vessel and the bed of the body of water.

10. The electronic variable-configuration lay ramp control system of claim 1, which is associated with:
a centralized monitoring system configured to acquire, monitor, and memorize detectable data related to the lay ramp and the pipeline laying vessel, and
a pipe-laying guidance system connected to the centralized monitoring system and configured to real-time monitor the amount of stress induced in the pipeline.

11. The electronic variable-configuration lay ramp control system of claim 10, which is associated with:
a lay ramp management system including:
a computer planner configured to implement an optimization program to determine the designated steps sequence, and
a computer scheduler configured to implement and check the steps.

12. The electronic variable-configuration lay ramp control system of claim 1, wherein when executed by the processor, the plurality of instructions cause the processor to:
generate a first plurality of steps sequences with a first designated step,
generate a second plurality of steps sequences with a second designated step, the first designated step being greater than the second designated step,
change the configuration of the lay ramp from the first configuration to the second, different work configuration,
select a first designated steps sequence from the generated first plurality of steps sequences, said selection being based on the acquired data to minimize the amount of stress induced in the pipeline at each intermediate configuration between the first work configuration and the second, different work configuration, and
select a second designated steps sequence from the generated second plurality of steps sequences, said selection being based on the acquired data to minimize the amount of stress induced in the pipeline at each intermediate configuration between the first work configuration and the second, different work configuration.

13. The electronic variable-configuration lay ramp control system of claim 1, wherein the designated steps sequence includes an optimal steps sequence.

14. A pipeline laying vessel comprising:
a lay ramp; and
an electronic variable-configuration lay ramp control system configured to:
acquire data related to a positional configuration of the lay ramp, the acquired data related to an amount of stress induced in a pipeline being laid on a bed of a body of water,
generate a plurality of steps sequences to change the positional configuration of the lay ramp relative to the bed of the body of water from a first work configuration to a second, different work configuration,
select a designated steps sequence from the generated plurality of steps sequences, said selection being based on the acquired data to minimize the amount of stress induced in the pipeline at each intermediate configuration between the first work configuration and the second, different work configuration, and
transmit a plurality of commands to the lay ramp, the transmitted plurality of commands cause the lay ramp to implement at least one step in the designated steps sequence.

15. A pipeline laying vessel variable-configuration lay ramp comprising:
a plurality of interconnected, adjustable-tilt segments;
a plurality of adjustable supports fitted to the segments, wherein each step in a steps sequence corresponds to a movement of an element between the segments and the supports; and
an electronic variable-configuration lay ramp control system configured to
acquire data related to a positional configuration of the pipeline laying vessel variable-configuration lay ramp, the acquired data related to a pipeline laying vessel and the acquired data related to an amount of stress induced in a pipeline being laid on a bed of a body of water,
generate a plurality of steps sequences to change the positional configuration of the lay ramp relative to the pipeline laying vessel from a first work configuration to a second, different work configuration,
select a designated steps sequence from the generated plurality of steps sequences, said selection being based on the acquired data to minimize the amount of stress induced in the pipeline at each intermediate configuration between the first work configuration and the second, different work configuration, and
transmit a plurality of commands to the lay ramp, the transmitted plurality of commands cause the lay ramp to implement at least one step in the designated steps sequence.

16. A pipeline laying vessel comprising:
a lay ramp including:
    a plurality of interconnected, adjustable-tilt segments, and
    a plurality of adjustable supports fitted to the segments, wherein each step in a steps sequence corresponds to a movement of an element between the segments and the supports; and
an electronic variable-configuration lay ramp control system configured to:
    acquire data related to a positional configuration of the lay ramp, the acquired data related to an amount of stress induced in a pipeline being laid on a bed of a body of water,
    generate a plurality of steps sequences to change the positional configuration of the lay ramp relative to the bed of the body of water from a first work configuration to a second, different work configuration,
    select an designated steps sequence from the generated plurality of steps sequences, said selection being based on the acquired data to minimize the amount of stress induced in the pipeline at each intermediate configuration between the first work configuration and the second, different work configuration, and
    transmit a plurality of commands to the lay ramp, the transmitted plurality of commands cause the lay ramp to implement at least one step in the designated steps sequence.

17. A method of controlling a variable-configuration lay ramp of a pipeline laying vessel to lay a pipeline on a bed of a body of water, the method comprising:
    acquiring data related to a positional configuration of the lay ramp, said data related to the pipeline laying vessel and the data related to an amount of stress induced in the pipeline;
    generating a plurality of steps sequences to change the positional configuration of the lay ramp relative to the pipeline laying vessel from a first work configuration to a second, different work configuration;
    selecting a designated steps sequence form the generated plurality of steps sequences, said selection being based on the acquired data to minimize the amount of stress induced in the pipeline at each intermediate configuration between the first work configuration and the second, different work configuration; and
    transmitting a plurality of commands to the lay ramp, the transmitted plurality of commands cause the lay ramp to implement at least one step in the designated steps sequence.

18. The method of claim 17, which includes:
assigning estimated values to each step in the designated steps sequence, the estimated values related to the intermediate configuration of the lay ramp,
acquiring data related to the configuration of the lay ramp in the intermediate configuration, and
comparing the estimated values with the acquired data.

19. The method of claim 18, which includes, when a difference between the estimated values and the acquired data related to the intermediate configuration of the lay ramp satisfies a designated acceptance criteria, transmitting a plurality of commands to the lay ramp, said plurality of commands cause the lay ramp to implement at least another step in the designated steps sequence.

20. The method of claim 18, which includes, when a difference between the estimated values and the acquired data related to the intermediate configuration of the lay ramp does not satisfy a designated acceptance criteria, disabling implementation of any additional steps in the designated steps sequence.

21. The method of claim 20, which includes:
generating another plurality of steps sequences to change the configuration of the lay ramp from an initial intermediate configuration to the second, different work configuration, and
selecting another designated steps sequence from the generated other plurality of steps sequences, said selection being based on the acquired data to minimize the amount of stress induced in the pipeline at each intermediate configuration between the initial intermediate configuration and the second, different work configuration.

22. The method of claim 17, which includes:
selecting the designated steps sequence based on genetic algorithms, and
constructing a fitness function related to the amount of stress induced in the pipeline.

23. The method of claim 17, which includes detecting a plurality of forces transmitted by the pipeline laying vessel and the lay ramp to the pipeline.

24. The method of claim 17, which includes calculating the configuration of the pipeline between the pipeline laying vessel and the bed of the body of water.

25. The method of claim 24, which includes calculating the amount of stress induced in the pipeline.

26. The method of claim 17, which includes:
generating a first plurality of steps sequences with a first designated step,
generating a second plurality of steps sequences with a second designated step, the first designated step being greater than the second designated step,
changing the configuration of the lay ramp from the first configuration to the second, different work configuration,
selecting a first designated steps sequence from the generated first plurality of steps sequences, said selection being based on the acquired data to minimize the amount of stress induced in the pipeline at each intermediate configuration between the first work configuration and the second, different work configuration, and
selecting a second designated steps sequence from the generated second plurality of steps sequences, said selection being based on the acquired data to minimize the amount of stress induced in the pipeline at each intermediate configuration between the first work configuration and the second, different work configuration.

27. The method of claim 17, wherein the designated steps sequence includes an optimal steps sequence.

28. A non-transitory computer readable medium storing a plurality of instructions loadable into a memory of a computer, said plurality of instructions configured to direct a processor of a computer to:
    acquire data related to a positional configuration of a lay ramp, said data related to a pipeline laying vessel and the data related to an amount of stress induced in the pipeline;
    generate a plurality of steps sequences to change the positional configuration of the lay ramp relative to the pipeline laying vessel from a first work configuration to a second, different work configuration;
    select a designated steps sequence form the generated plurality of steps sequences, said selection being based on the acquired data to minimize the amount of stress induced in the pipeline at each intermediate configuration between the first work configuration and the second, different work configuration; and transmit a plurality of commands to the lay ramp, the transmitted plurality of commands cause the lay ramp to implement at least one step in the designated steps sequence.

* * * * *